United States Patent
Kim et al.

(10) Patent No.: US 8,593,935 B2
(45) Date of Patent: Nov. 26, 2013

(54) METHOD OF TRANSMITTING DATA IN MULTI-CELL COOPERATIVE WIRELESS COMMUNICATION SYSTEM

(75) Inventors: Hyung Tae Kim, Anyang-si (KR); Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 269 days.

(21) Appl. No.: 13/127,199

(22) PCT Filed: Oct. 16, 2009

(86) PCT No.: PCT/KR2009/005975
§ 371 (c)(1),
(2), (4) Date: May 2, 2011

(87) PCT Pub. No.: WO2010/076949
PCT Pub. Date: Jul. 8, 2010

(65) Prior Publication Data
US 2011/0211547 A1 Sep. 1, 2011

Related U.S. Application Data

(60) Provisional application No. 61/110,926, filed on Nov. 3, 2008.

(30) Foreign Application Priority Data

Dec. 23, 2008 (KR) .................. 10-2008-0132530

(51) Int. Cl.
*H04J 11/00* (2006.01)
*H04W 4/00* (2009.01)
*H04B 7/216* (2006.01)
*H04L 27/00* (2006.01)

(52) U.S. Cl.
USPC ............ 370/208; 370/328; 370/335; 375/299

(58) Field of Classification Search
None
See application file for complete search history.

(56) References Cited

U.S. PATENT DOCUMENTS

| | | | |
|---|---|---|---|
| 2002/0196767 A1* | 12/2002 | Sim ................................ | 370/342 |
| 2005/0037718 A1* | 2/2005 | Kim et al. ..................... | 455/101 |
| 2007/0160162 A1* | 7/2007 | Kim et al. ..................... | 375/267 |
| 2008/0130611 A1* | 6/2008 | Branlund et al. ............. | 370/342 |
| 2008/0144737 A1* | 6/2008 | Naguib .......................... | 375/299 |
| 2008/0144738 A1* | 6/2008 | Naguib .......................... | 375/299 |
| 2008/0304464 A1* | 12/2008 | Borkar et al. ................. | 370/342 |
| 2009/0061842 A1* | 3/2009 | Park et al. ................. | 455/422.1 |
| 2009/0264142 A1* | 10/2009 | Sankar et al. ................. | 455/501 |
| 2010/0041406 A1* | 2/2010 | Kim et al. ..................... | 455/446 |

FOREIGN PATENT DOCUMENTS

| | | |
|---|---|---|
| KR | 10-2007-0046755 A | 5/2007 |
| KR | 10-2008-0074419 A | 8/2008 |
| KR | 10-2008-0087211 A | 10/2008 |

* cited by examiner

*Primary Examiner* — Melanie Jagannathan
(74) *Attorney, Agent, or Firm* — Birch, Stewart, Kolasch & Birch, LLP

(57) ABSTRACT

A method of transmitting data in a multi-cell cooperative wireless communication system is provided. The method includes splitting data to be transmitted into first data and second data, determining a first beamforming vector for the first data and a second beamforming vector for the second data, and transmitting the first data by using the first beamforming vector and the second data by using the second beamforming vector. The present invention provides a data transmission method which does not cause deterioration of overall system performance while minimizing inter-cell interference.

15 Claims, 6 Drawing Sheets

METHOD OF TRANSMITTING DATA IN MULTI-CELL COOPERATIVE WIRELESS COMMUNICATION SYSTEM

CROSS REFERENCE TO RELATED APPLICATIONS

This application is the National Phase of PCT/KR2009/005975 filed on Oct. 16, 2009, which claims priority under 35 U.S.C. 119(e) to U.S. Provisional Application No. 61/110,926 filed on Nov. 3, 2008 and under 35 U.S.C. 119(a) to Patent Application No. KR-10-2008-0132530 filed in the Republic of Korea on Dec. 23, 2008, all of which are hereby expressly incorporated by reference into the present application.

TECHNICAL FIELD

The present invention relates to wireless communications, and more particularly, to a method of transmitting data in a multi-cell cooperative wireless communication system.

BACKGROUND ART

In next generation multimedia mobile communication systems, which have been actively studied in recent years, there is a demand for a system capable of processing and transmitting a variety of information (e.g., video and radio data) at a higher data rate in addition to the early-stage voice service.

Orthogonal frequency division multiplexing (OFDM) capable of having a high data rate has drawn attention in recent years. The OFDM is a multi-carrier modulation scheme for transmitting data by dividing a frequency band into a plurality of orthogonal subcarriers. Orthogonal frequency division multiple access (OFDMA) is a scheme for providing multi-user multiplexing by combining the OFDM with frequency division multiple access (FDMA), time division multiple access (TDMA), or code division multiple access (CDMA).

A wireless communication system includes a base station (BS) and at least one user equipment (UE). The UE may be fixed or mobile, and may be referred to as another terminology, such as a mobile station (MS), a user terminal (UT), a subscriber station (SS), a wireless device, etc. The BS is generally a fixed station that communicates with the UE and may be referred to as another terminology, such as an evolved node-B (eNB), a base transceiver system (BTS), an access point, etc. Hereinafter, an uplink (UL) denotes a communication link from the UE to the BS, and a downlink (DL) denotes a communication link from the BS to the UE.

For effective system configuration, the wireless communication system has a cell structure. A cell is a region in which a wide area is divided into small areas for effective frequency use. In general, the BS is installed in a center of the cell to relay the UE, and the cell corresponds to a service area of one BS.

If the same subcarrier is used by neighbor cells of an OFDM/OFDMA system in a multi-cell environment, users may experience interference. This is referred to as inter-cell interference. In particular, the inter-cell interference is seriously problematic for a UE located near a cell boundary. When the UE is located near the cell boundary in DL transmission, the UE experiences strong interference from the neighbor cells. When the UE is located near the cell boundary in UL transmission, the UE causes strong interference to the neighbor cells, and has a low data rate due to a path loss in a serving cell.

To decrease inter-cell interference, different subcarriers may be used between neighbor cells, which may result in a problem of decrease in radio resources capable of being used by one BS.

A multi-cell cooperative scheme is proposed to decrease inter-cell interference. The multi-cell cooperative scheme can improve communication performance of a UE located near a cell boundary. In association thereto, several discussions are ongoing concerning a method of transmitting and processing data by using the multi-cell co-operative scheme.

DISCLOSURE OF INVENTION

Technical Problem

A multi-cell cooperative scheme can be classified into several types according to a possible data sharing level between neighbor cells. Theoretically, it is advantageous for the neighbor cells to share data as much as possible in terms of system performance enhancement. However, data sharing requires separate signal information defined between a base station (BS) and a user equipment (UE) and between one BS to another BS. Accordingly, a problem arises such as additional bandwidth usage, time delay for information delivery, and so on, which is problematic in actual implementation. In particular, when transmit (Tx) data is shared by BSs, a separate controller exists in a higher layer of BSs participating in cooperation, and centralized scheduling needs to be performed to determine a specific BS which will transmit a specific amount of specific data. Accordingly, there is a problem in that more control signals are transmitted, and scalability and environmental adaptability are decreased. Therefore, in practice, it is preferable to use a method in which BSs cooperate with one another by exchanging control signals to a minimum extent in a situation where no data is shared between neighbor cells. Examples of such a method include fractional frequency reuse (FFR), precoding matrix indicator (PMI) coordination, collision avoidance (CA)-beamforming, etc.

According to the FFR, a neighbor cell transmits a signal by decreasing Tx power with respect to time and frequency domains in which a serving cell transmits a signal to a UE located in a cell boundary, and thus inter-cell interference can be decreased. The neighbor cell which has decreased the Tx power can decrease a loss of spectral efficiency by transmitting a signal to a UE located in a cell center in which a high data transfer rate can be achieved with low Tx power. Accordingly, without having to share a channel state and Tx data between neighbor cells, it is sufficient that one cell announces information to its neighbor cell, wherein the information includes information indicating a specific time and frequency domain in which a service is provided to a UE located in a cell boundary and information indicating a level of Tx power to be decreased by the neighbor cell. However, since the neighbor cell does not use maximum Tx power allocated to the neighbor cell to decrease inter-cell interference, efficiency of resource utilization is decreased, and an overall data transfer rate is decreased.

According to the PMI coordination or CA-beamforming, beamforming is performed to decrease interference to a neighbor cell by sharing channel information between neighbor cells. Each UE estimates a self-cell channel as well as a neighbor cell channel, and can request the neighbor cell to select a PMI for minimizing interference to the neighbor cell itself. Accordingly, since a cell has to determine a PMI within a range causing weak interference to the neighbor cell, a range of selecting the PMI is decreased, and an overall data transfer rate is decreased.

That is, according to the FFR, the PMI coordination, or the CA-beamforming, performance of a UE located in a cell boundary is improved due to decrease in the inter-cell interference, but overall system throughput is also decreased.

Accordingly, the present invention provides a data transmission method for decreasing inter-cell interference by using a multi-cell cooperative scheme. In particular, the present invention provides a method of improving performance of a UE located in a cell boundary and overall system throughput.

Solution to Problem

According to an aspect of the present invention, a method of transmitting data in a multi-cell cooperative wireless communication system is provided. The method includes splitting data to be transmitted into first data and second data, determining a first beamforming vector for the first data and a second beamforming vector for the second data, and transmitting the first data by using the first beamforming vector and the second data by using the second beamforming vector.

According to another aspect of the present invention, a method of transmitting feedback information in a multi-cell cooperative wireless communication system is provided. The method includes estimating a first channel state with respect to a serving base station and a second channel state with respect to a neighbor base station, determining feedback information comprising beamforming information for data transmission of the neighbor base station by considering the estimated first and second channel state, and transmitting the feedback information to the neighbor base station.

Advantageous Effects of Invention

The present invention provides a data transmission method which does not cause deterioration of overall system performance while minimizing inter-cell interference.

MODE FOR THE INVENTION

Figure 1:
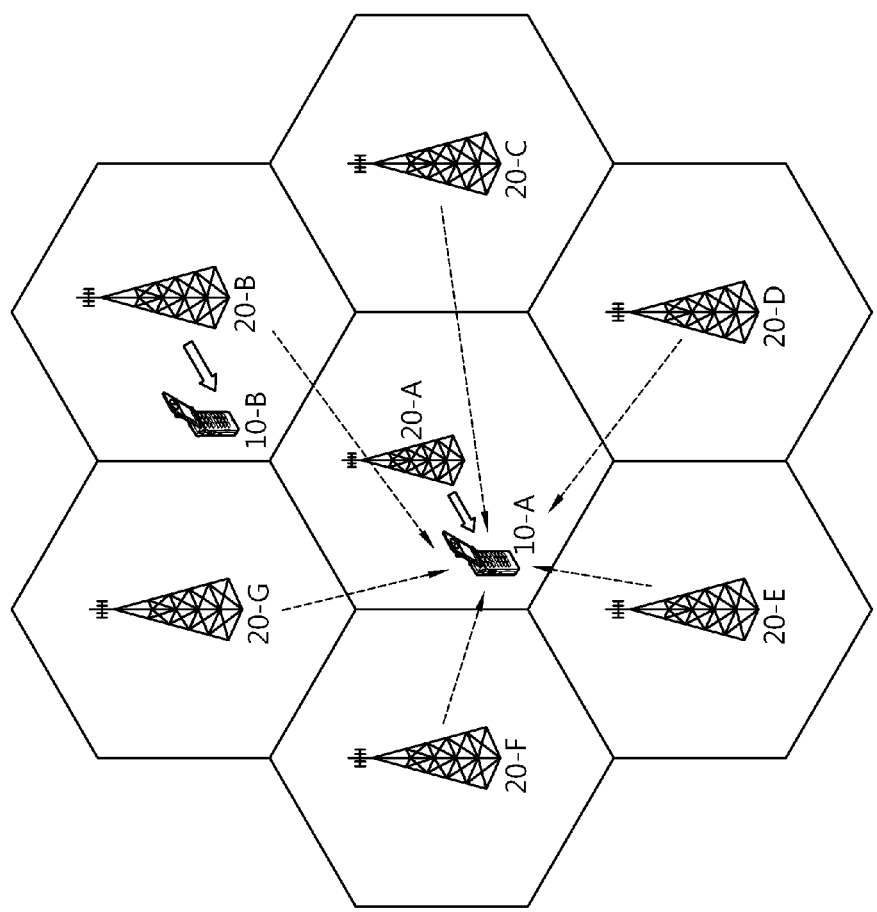
FIG. 1 shows an example of a wireless communication system in a multi-cell environment.

FIG. 1 shows an example of a wireless communication system in a multi-cell environment.

Referring to FIG. 1, the wireless communication system includes a base station (BS) 20 and at least one user equipment (UE) 10. The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). A transmitter transmits data by performing IFFT. A receiver recovers original data by performing FFT on a received signal. The transmitter uses IFFT to combine the plurality of subcarriers, and the receiver uses FFT to split the plurality of subcarriers. In downlink transmission, the transmitter may be a part of the BS 20, and the receiver may be a part of the UE 10. In uplink transmission, the transmitter may be a part of the UE 10, and the receiver may be a part of the BS 20.

The BS 20 may belong to at least one cell. The cell is a region in which the BS 20 provides a communication service. A plurality of BSs having at least one cell may be arranged to establish a multi-cell configuration. A BS providing the UE 10 with the communication service is referred to as a serving BS. A BS adjacent to the serving BS is referred to as a neighbor BS. A cell of the serving BS is referred to as a serving cell. A cell of the neighbor BS is referred to as a neighbor cell.

Assume that a $BS_A$ 20-A provides a $UE_A$ 10-A with a communication service and a $BS_B$ 20-B provides a $UE_B$ 10-B with a communication service. From the perspective of the $UE_A$ 10-A, the $BS_A$ 20-A is a serving BS and the $BS_B$ 20-B is a neighbor BS. From the perspective of the $UE_B$ 10-B, the $BS_B$ 20-B is a serving BS, and the $BS_A$ 20-A is a neighbor BS. Assume that the $UE_A$ 10-A and the $UE_B$ 10-B are located in boundaries of their serving cells. The $BS_A$ 20-A performs scheduling to allocate a radio resource to the $UE_A$ 10-A, and transmits downlink (DL) data. The DL data transmitted by the $BS_B$ 20-B can be received not only by the $UE_B$ 10-B but also by the $UE_A$ 10-A. Therefore, the DL data of the $BS_B$ 20-B may act as strong interference to the $UE_A$ 10-A. Since an OFDMA system has orthogonality in a frequency domain in the same cell, UEs using different frequency bands do not interfere with each other. The orthogonality is not maintained between UEs using the same frequency band in neighbor cells, and thus interference may occur. If the $BS_A$ 20-A and the $BS_B$ 20-B cooperate with each other, antennas located in each BS operate by considering UEs located in different cells. That is, the OFDMA system can be regarded as a multi-antenna system in which antennas are distributed over several cells. Therefore, a scheme in which the $BS_A$ 20-A and the $BS_B$ 20-B cooperate with each other can be referred to as a multi-cell cooperation scheme.

Figure 2:
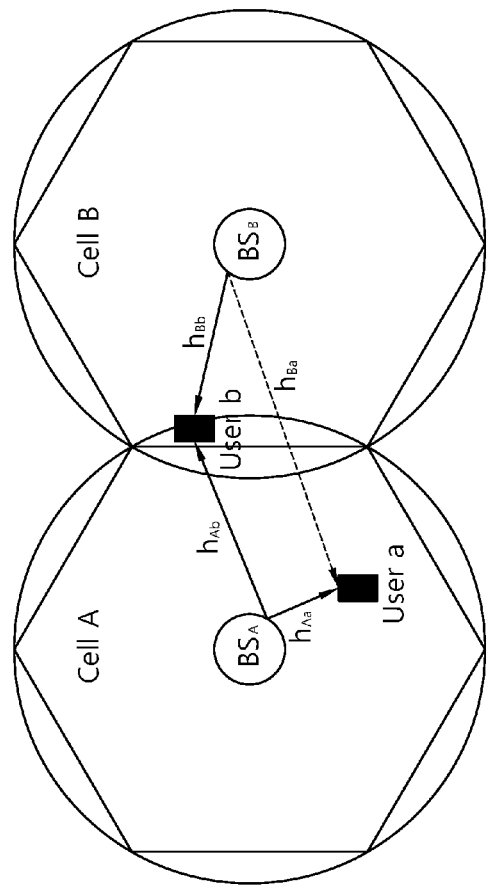
FIG. 2 shows an example of two neighbor cells according to an embodiment of the present invention.

FIG. 2 shows an example of two neighbor cells according to an embodiment of the present invention.

Referring to FIG. 2, a 'user a' (or UE a) is located in a center of a cell A, and a 'user b' (or UE b) is located in a boundary of a cell B. A $BS_A$ belongs to the cell A, and a $BS_B$ belongs to the cell B. From the perspective of the user a, the cell A is a serving cell, and the cell B is a neighbor cell. From the perspective of the user b, the cell B is a serving cell, and the cell A is a neighbor cell. Since the user b is located in a boundary of the cell B, the user b may experience strong interference caused by the cell A. Since the user a is located in a center of the cell A, the user a may experience relatively weak interference caused by the cell B. The user a and the user b use the same time instance and the same frequency band for data service, and receive DL data while experiencing mutual interference. The cell A and the cell B can share scheduling information for time and frequency resources. It is assumed that the cell A intends to decrease DL interference to the user b. A channel between the $BS_A$ and the user a is indicated by $h_{Aa}$. A channel between the $BS_A$ and the user b is indicated by $h_{Ab}$. A channel between the $BS_B$ and the user a is indicated by $h_{Ba}$. A channel between the $BS_B$ and the user b is indicated by $h_{Bb}$.

The $BS_A$ transmits DL data to the user a. In this case, the $BS_A$ splits the DL data into two layers, i.e., private data $d_{Ap}$ and common data $d_{Ac}$, and thus can simultaneously transmit the two-layered data by using a superposition coding or the like. The common data $d_{Ac}$ can be decoded by both the user a and the user b, or can be decoded by only the user a. The $BS_B$ transmits DL data to the user b. In this case, the DL data may be private data $d_{Bp}$.

The user a receives the private data $d_{Ap}$ and the common data $d_{Ac}$ from the $BS_A$. The user a decodes the common data $d_{Ac}$ having interference caused by the private data $d_{Ap}$, and decodes the private data $d_{Ap}$ after canceling the interference caused by the common data $d_{Ac}$.

The user b receives the private data $d_{Bp}$ from the $BS_B$. Since the user b is located in a boundary of the cell A and the cell B, the user b can receive the private data $d_{Ap}$ and the common data $d_{Ac}$ which are transmitted by the $BS_A$ to the user a.

If the user b can decode the common data $d_{Ac}$ received from the $BS_A$ A, the user b decodes the common data $d_{Ac}$ received from the $BS_A$ in the presence of interference caused by the private data $d_{Bp}$ received from the $BS_B$ and the private data $d_{Ap}$ received from the $BS_A$, and decodes the private data $d_{Bp}$ received from the $BS_B$ after canceling the interference caused by the common data $d_{Ac}$. Thereafter, the user b discards the common data $d_{Ac}$. Accordingly, the user b can cancel interference from a part of a signal (i.e., the common data $d_{Ac}$ received from the $BS_A$) acting as interference to the user b.

However, if the user b cannot decode the common data $d_{Ac}$ received from the $BS_A$, the user b decodes the private data $d_{Bp}$ received from the $BS_B$ in the presence of interference caused by the private data $d_{Ap}$ and common data $d_{Ac}$ received from the $BS_A$.

Hereinafter, for convenience of explanation, two neighbor cells shown in FIG. 2 will be described for example. However, the present invention is not limited thereto, and thus a plurality of neighbor cells may exist for one serving cell. On the contrary to the example of FIG. 2, a 'UE a' may be located in a cell boundary and a 'UE b' may be located inside a cell, or both of the UEs may be located in a cell boundary. In addition, the present invention can be applied to the case of multi-user MIMO through straight forward extension.

First, a received signal to interference and noise ratio (SINR) of data in a multi-cell cooperative wireless communication system will be described. It is assumed that a BS has Nt transmit (Tx) antennas, and a UE has Nr receive (Rx) antennas.

Equation 1 below shows an Rx SINR of each data when the UE b can decode common data $d_{Ac}$ received from a BS A. Equation 2 below shows an Rx SINR of each data when the UE b cannot decode the common data $d_{Ac}$ received from the BS A.

MathFigure 1

$$SINR_{Ap} = \frac{|u_{Ap}h_{Aa}v_A|^2(1-\alpha)p_A}{\|u_{Ap}\|^2 N_a + |u_{Ap}h_{Ba}v_B|^2 p_B},$$ [Math. 1]

$$SINR_{Bp} = \frac{|u_{Bp}h_{Bb}v_B|^2 p_B}{\|u_{Bp}\|^2 N_b + |u_{Bp}h_{Ab}v_A|^2(1-\alpha)p_A},$$

$$SINR_{Ac} = \min(SINR_{Ac,a}, SINR_{Ac,b}), \text{ where}$$

$$SINR_{Ac,a} = \frac{|u_{Ac}h_{Aa}v_c|^2 \alpha p_A}{\|u_{Ac}\|^2 N_a + |u_{Ac}h_{Aa}v_A|^2(1-\alpha)p_A + |u_{Ac}h_{Ba}v_B|^2 p_B},$$

$$SINR_{Ac,b} = \frac{|u_{Bc}h_{Ab}v_c|^2 \alpha p_A}{\|u_{Bc}\|^2 N_b + |u_{Bc}h_{Ab}v_A|^2(1-\alpha)p_A + |u_{Bc}h_{Bb}v_B|^2 p_B}.$$

MathFigure 2

$$SINR_{Ap} = \frac{|u_{Ap}h_{Aa}v_A|^2(1-\alpha)p_A}{\|u_{Ap}\|^2 N_a + |u_{Ap}h_{Ba}v_B|^2 p_B},$$ [Math. 2]

$$SINR_{Bp} = \frac{|u_{Bp}h_{Bb}v_B|^2 p_B}{\|u_{Bp}\|^2 N_b + |u_{Bp}h_{Ab}v_A|^2(1-\alpha)p_A + |u_{Bp}h_{Ab}v_c|^2(\alpha)p_A},$$

$$SINR_{Ac} = \frac{|u_{Ac}h_{Aa}v_c|^2 \alpha p_A}{\|u_{Ac}\|^2 N_a + |u_{Ac}h_{Aa}v_A|^2(1-\alpha)p_A + |u_{Ac}h_{Ba}v_B|^2 p_B}$$

$SINR_{Ap}$ denotes an Rx SINR of private data $d_{Ap}$, $SINR_{Bp}$ denotes an Rx SINR of private data $d_{Bp}$, and $SINR_{Ac}$ denotes an Rx SINR of common data $d_{Ac}$. $SINR_{Ac,a}$ is an Rx SINR of common data $d_{Ac}$ experienced by the UE a, and $SINR_{Ac,b}$ is an Rx SINR of common data $d_{Ac}$ experienced by the UE b. $h_{Aa}$ denotes a channel between the BS A and the UE a, $h_{Ab}$ denotes a channel between a BS B and the UE a, and $h_{Ba}$ denotes a channel between the BS B and the UE b. $h_{Aa}$, $h_{Ab}$, and $h_{Ba}$ may have a format of Nr×Nt. $N_a$ denotes interference and noise experienced by the UE a and the UE b. $v_A$ is a column vector representing a closed loop (CL) beamforming (BF) for private data $d_{Ap}$ transmitted from the BS A, $v_B$ is a column vector representing a CL BF for private data $d_{Bp}$ transmitted from the BS B, and $v_c$ is a column vector representing a CL BF for common data $d_{Ac}$ transmitted from the BS A. $p_A$ denotes total Tx power of the BS A, and $p_B$ denotes total Tx power of the BS B. It is a value in the range between 0 and 1, and denotes a ratio of Tx power allocated to common data $d_{Ac}$ among the total Tx power of the BS A. $u_{Ap}$ is a row vector representing an Rx BF for private data $d_{Ap}$ for the UE a, $u_{Ac}$ is a row vector representing an Rx BF for common data $d_{Ac}$ for the UE a, $u_{Bp}$ is a row vector representing an Rx BF for private data $d_{Bp}$ for the UE b, and $u_{Bc}$ is a row vector representing an Rx BF for common data $d_{Ac}$ for the UE b.

When an SINR is given, a maximum data transfer rate capable of recovering a signal without errors is defined as R(SINR). That is, $R(SINR_{Ap})$ denotes a maximum data transfer rate $R_{AP}$ of private data $d_{Ap}$ for the BS A, $R(SINR_{Ac})$ denotes a maximum data transfer rate $R_{Ac}$ of common data $d_{Ac}$ for the BS A, and $R(SINR_{Bp})$ denotes a maximum transfer rate $R_{Bp}$ of private data $d_{Bp}$ for the BS B. It is assumed that the data can be decoded without errors if the data transfer rate is less than R(SINR). In order to allow the UE a and the UE b to be able to decode the common data $d_{Ac}$ for the BS A without errors, the data transfer rate $R_A$, of the common data $d_{Ac}$ for the BS A can be determined by Equation 3 below.

MathFigure 3

$$R_{Ac} = \min(R(SINR_{Ac,a}), R(SINR_{Ac,b}))$$ [Math. 3]

That is, the data transfer rate $R_{Ac}$ of the common data $d_{Ac}$ for the BS A is set to a smaller value between $R(SINR_{Ac,a})$ and $R(SINR_{Ac,b})$.

A UE located in a boundary of a neighbor cell may experience interference when a BS transmits DL data in a multi-cell cooperative wireless communication system. Several methods for decreasing the interference to the UE located in the boundary of the neighbor cell have been proposed, but these methods have a problem of decrease in overall system performance. Accordingly, there is a need for a data transmission method capable of maximizing overall system performance while minimizing interference to the UE located in the boundary of the neighbor cell.

Figure 3:
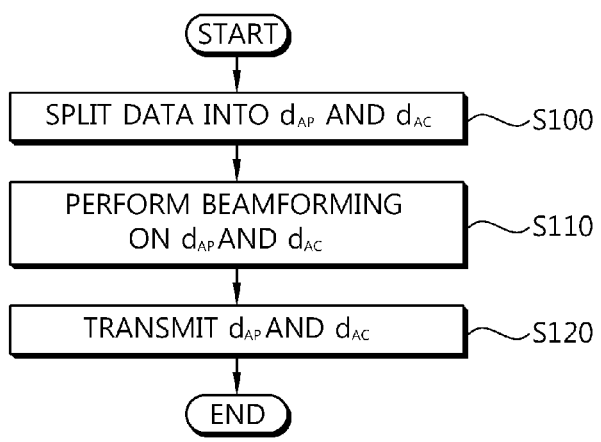
FIG. 3 is a flowchart showing a data transmission method according to an embodiment of the present invention.

FIG. 3 is a flowchart showing a data transmission method according to an embodiment of the present invention. For convenience of explanation, the following description will be based on structures of cells and UEs exemplified in FIG. 2. However, locations of the UEs in the cells are not limited thereto. A cell A and a cell B can share scheduling information on time and frequency resources.

Referring to FIG. 3, a BS A splits data to be transmitted to a UE a into common data $d_{Ac}$ and private data $d_{Ap}$ (step S100). An UE b located in a boundary of the neighbor cell B can receive the common data $d_{Ac}$ and the private data $d_{Ap}$, and the common data $d_{Ac}$ and the private data $d_{Ap}$ may act as interference to the UE b. The common data $d_{Ac}$ may be decoded by both the UE a and the UE b, or may be decoded by only the UE a.

The BS A performs beamforming on the common data $d_{Ac}$ and the private data $d_{Ap}$ (step S110). On the basis of feedback information received from the UEs, the BS A can perform beamforming on each of the common data $d_{Ac}$ and the private data $d_{Ap}$. A method of performing beamforming will be described below in detail.

On the basis of a result obtained by performing beamforming in step S110, the BS A transmits the common data $d_{Ac}$ and the private data $d_{Ap}$ to the UE a (step S120).

Hereinafter, a method of performing beamforming is described.

Figure 4:
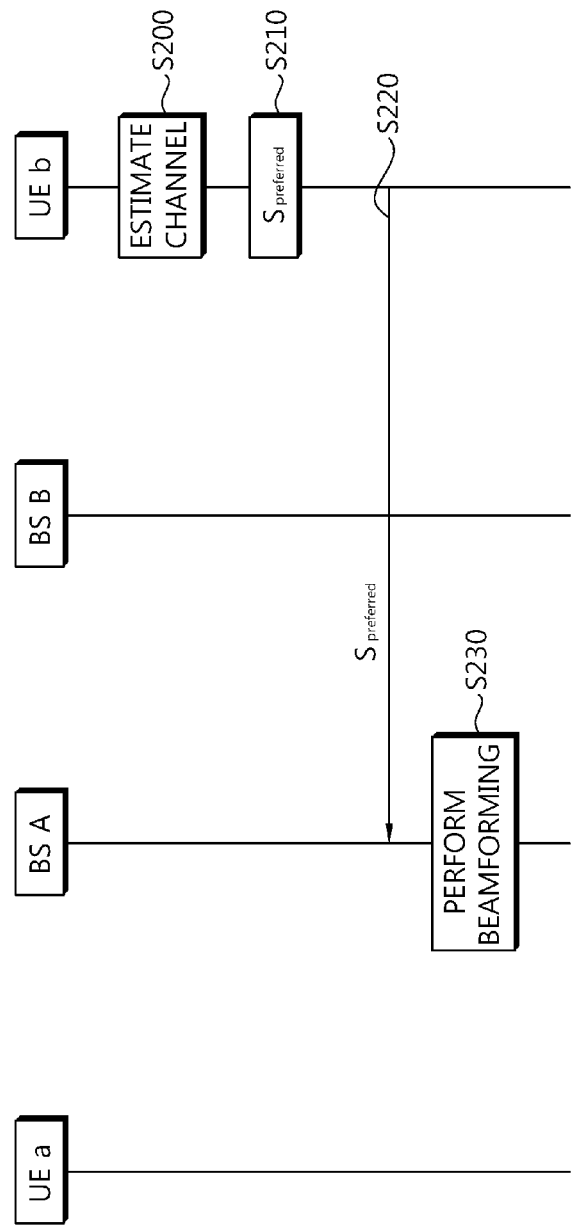
FIG. 4 is a flowchart showing a method of performing beamforming according to an embodiment of the present invention.

FIG. 4 is a flowchart showing a method of performing beamforming according to an embodiment of the present invention. For convenience of explanation, the following description will be based on structures of cells and UEs exemplified in FIG. 2. However, locations of the UEs in the cells are not limited thereto. A cell A and a cell B can share scheduling information on time and frequency resources. When a BS B transmits DL data to a UE b, a UE a located in a center of the neighbor cell A experiences weak interference from the BS B. Therefore, it is assumed that the BS B performs beamforming by considering only the serving cell B without consideration of the neighbor cell A. It is assumed that a beamforming vector $v_B$ denotes a beamforming vector for the DL data (i.e., private data $d_{Bp}$) transmitted by the BS B to the UE b.

Referring to FIG. 4, the UE b estimates a channel state between a serving BS and a neighbor BS (step S200). The UE b can estimate the channel state by using a reference signal received from a BS A and the BS B.

By considering the channel state estimated in step S200, the UE b selects a beamforming matrix for data transmitted by the BS A to the UE a (step S210). The beamforming matrix can also be referred to as a precoding matrix. Since the UE b is located in a boundary of the cell A and the cell B, the UE b may experience interference caused by data transmitted by the BS A to the UE a. Therefore, the UE b may select a beamforming matrix causing weakest interference to the UE b. That is, the UE b may select a beamforming matrix causing weakest interference to the UE b from a whole beamforming matrix set $S_A$ that can be selected by the BS A. The UE b may select a plurality of beamforming matrices. Herein, the plurality of beamforming matrices selected by the UE b is defined as a preferred beamforming matrix set $S_{preferred}$. Equation 4 below shows a criterion for selecting the beamforming matrix constituting the preferred beamforming matrix set $S_{preferred}$.

MathFigure 4

$$S_{preferred} = \left\{ n \left| \frac{|u_{Bp}h_{Bb}v_B|^2 p_B}{\|u_{Bp}\|^2 N_b + |u_{Bp}h_{Ab}v_n|^2 p_A} \geq SINR_{th\_p}, n \in S_A \right. \right\} \quad \text{[Math. 4]}$$

he beamforming matrix constituting the preferred beamforming matrix set $S_{preferred}$ may be beamforming matrices assuring that Rx SINR of the private data $d_{Bp}$ is greater than or equal to a given threshold $SINR_{th\_p}$. Another criterion for determining $S_{preferred}$ is shown in Equation 5.

MathFigure 5

$$S_{preferred} = \{ n | tr((h_{Ab}v_n)^* h_{Ab}v_n) p_A < \rho, n \in S_A \} \quad \text{[Math. 5]}$$

where $\rho$ is pre-determined threshold and x* is the conjugate transpose of x.

The UE b reports the preferred beamforming matrix set $S_{preferred}$ to the BS A (step S220). If the direct channel from UE b to BS A is not available, UE b reports $S_{preferred}$ to BS B and then BS A receives that from BS B through the backhaul link that connects the two BSs. The BS A performs beamforming on the basis of the preferred beamforming matrix set $S_{preferred}$ received from the UE b (step S230). In this case, the BS A may split data to be transmitted to the UE a into private data $d_{Ap}$ and common data $d_{Ac}$, and determine a Tx beamforming vector $v_A$ for the private data $d_{Ap}$ and a Tx beamforming vector $v_C$ for the common data $d_{Ac}$. When the BS A determines the Tx beamforming vector ($v_A = v_i$) for the private data $d_{Ap}$ and the Tx beamforming vector ($v_C = v_j$) for the common data $d_{Ac}$, four methods can be used according to ranges of i and j. A method of determining a Tx beamforming vector by the BS A will be described hereinafter in detail. A first method and a second method determine the Tx beamforming vector for the private data $d_{Ap}$ without consideration of interference to a neighbor cell B. A third method and a fourth method determine the Tx beamforming vector for the private data $d_{Ap}$ by considering interference to the cell B.

1. $i \in S_A$, $j \in S_{preferred}^C$

Herein, $S_{preferred}^C$ denotes a complementary set of $S_{preferred}$ (i.e. $S_{preferred}^C = S_A - S_{preferred}$). Without consideration of interference to the neighbor cell B, the Tx beamforming vector for the private data $d_{Ap}$ may be determined to a beamforming vector capable of maximizing performance of the UE a among the whole beamforming matrix set $S_A$ that can be selected by the BS A. The Tx beamforming vector for the common data $d_{Ac}$ may be determined to a beamforming vector causing strong interference to the neighbor cell B. For example, the Tx beamforming vector for the common data $d_{Ac}$ may be determined to the beamforming vector capable of maximizing performance of the UE a among the beamforming matrix set $S_{preferred}^C$ causing strong interference to the UE b.

The BS A transmits data to be transmitted to the UE a by splitting the data into private data $d_{Ap}$ and common data $d_{Ac}$. In this case, if the common data $d_{Ac}$ can be decoded by not only the UE a but also the UE b located in a cell boundary, the UE b can cancel interference caused by the common data $d_{Ac}$.

If a data transfer rate of the common data $d_{Ac}$ is determined to a minimum value between a data transfer rate of the common data $d_{Ac}$ for the UE a and a data transfer rate of the common data $d_{Ac}$ for the UE b, the common data $d_{Ac}$ can be decoded by the UE a and the UE b. If the data transfer rate (i.e., the minimum value between the data transfer rate of the common data $d_{Ac}$ for the UE a and the data transfer rate of the common data $d_{Ac}$ for the UE b) of the common data $d_{Ac}$ is maximized by properly determining the Tx beamforming vector $v_C$ for the common data $d_{Ac}$, interference from the BS A can be decreased from the perspective of the UE b, and data reception performance can be increased from the perspective of the UE a. The UE b located in the cell boundary is farther separated from the BS A than the UE a, and thus experiences a great path loss in many cases. Therefore, in order to maximize the data transfer rate (i.e., the minimum value between the data transfer rate of the common data $d_{Ac}$ for the UE a and the data transfer rate of the common data $d_{Ac}$ for the UE b) of the common data $d_{Ac}$, the Tx beamforming vector $v_C$ for the common data $d_{Ac}$ can be determined to the beamforming vector among the beamforming matrix set $S_{preferred}^C$ which is not preferred by the user b (i.e., beamforming matrix with strong signal strength to the user b).

2. $i \in S_A$, $j \in S_{preferred}$

Without consideration of interference to the neighbor cell B, the Tx beamforming vector for the private data $d_{Ap}$ may be determined to a beamforming vector capable of maximizing performance of the UE a among the whole beamforming matrix set $S_A$ that can be selected by the BS A. The Tx beamforming vector for the common data $d_{Ac}$ may be determined to a beamforming vector capable of maximizing performance of the UE a among the preferred beamforming matrix set causing weak interference to the neighbor cell B.

By selecting the Tx beamforming vector for the common data $d_{Ac}$ from the preferred beamforming matrix set $S_{preferred}$, the common data $d_{Ac}$ may be received by the UE b with weak signal strength. That is, $SINR_{Ac,b}$, i.e., an Rx SINR of the UE b for the common data $d_{Ac}$, may be a significantly small value. Accordingly, when the common data $d_{Ac}$ can be decoded by both the UE a and the UE b, a data transfer rate of the common data $d_{Ac}$ may be a data transfer rate of the common data $d_{Ac}$ for the UE b. In this case, a problem arises in that a total data transfer rate (i.e., $R_{Ap}+R_{Ac}+R_{Bp}$) decreases in comparison with a case of using the first method (i.e., $i \in S_A$, $j \in S_{preferred}^C$).

However, if the UE b cannot decode the common data $d_{Ac}$, the second method (i.e., $i \in S_A$, $j \in S_{preferred}$) is advantageous over the first method. That is, the UE b decodes the private data $d_{Bp}$ received from the BS B in the presence of interference caused by the private data $d_{Ap}$ and common data $d_{Ac}$ received from the BS A. In this case, since the beamforming vector for the common data $d_{Ac}$ is selected from the preferred beamforming matrix set $S_{preferred}$ causing weak interference to the UE b, interference caused by the BS A to the UE b can be decreased in advance. In particular, since the UE b does not have to perform successive interference cancellation (SIC) or the like to cancel interference caused by the common data $d_{Ac}$, a processing overhead resulted from an additional operation of the UE b can be decreased. In addition, since the data transfer rate of the common data $d_{Ac}$ can be determined to a value capable of maximizing performance of the UE a without having to be determined to a minimum value between the data transfer rate of the common data $d_{Ac}$ for the UE a and the data transfer rate of the common data $d_{Ac}$ for the UE b, a total data transfer rate can be prevented from decreasing. Herein, an Rx SINR for determining the data transfer rate of the common data $d_{Ac}$ can be defined by Equation 2 above.

In summary, the BS A determines a beamforming vector for the private data $d_{Ap}$ to a beamforming vector for maximizing a data transfer rate for the UE a, and determines a beamforming vector for the common data $d_{Ac}$ to a beamforming vector for maximizing performance of the UE a under the condition that interference to the UE b located in the boundary of the cell B is maintained to a specific level or lower. Accordingly, the BS A can determine a Tx beamforming vector for the private data $d_{Ap}$ and a Tx beamforming vector for the common data $d_{Ac}$, so that performance of the UE a can be increased while decreasing interference to the UE b located in the boundary of the cell B.

3. $i \in S_{preferred}$, $j \in S_{preferred}^C$

The Tx beamforming vector for the private data $d_{Ap}$ may be determined to a beamforming vector for maximizing performance of the UE a among the preferred beamforming matrix set $S_{preferred}$ received from the UE b. The Tx beamforming vector for the common data $d_{Ac}$ may be determined to a beamforming vector causing strong interference to the neighbor cell B. That is, the Tx beamforming vector for the common data $d_{Ac}$ may be determined to a beamforming vector capable of maximizing performance of the UE a among the beamforming matrix set $S_{preferred}^C = S_A - S_{preferred}$ causing strong interference to the UE b.

Accordingly, the BS A can transmit the private data $d_{Ap}$ so that the BS A causes weak interference to the UE b located in the neighbor cell B. In addition, as in the first method, even in a case where both the UE a and the UE b can decode the common data $d_{Ac}$, the BS A may causes minimum interference to the UE b, and the common data $d_{Ac}$ can be transmitted such that performance of the UE a can be maximized.

4. $i \in S_{preferred}$, $j \in S_{preferred}$

The Tx beamforming vector for the private data $d_{Ap}$ may be determined to the beamforming vector for maximizing performance of the UE a among the preferred beamforming matrix set $S_{preferred}$ received from the UE b. The Tx beamforming vector for the common data $d_{Ac}$ may also be determined to the beamforming vector for maximizing performance of the UE a among the preferred beamforming matrix set $S_{preferred}$ received from the UE b. That is, the BS A can transmit the private data $d_{Ap}$ and the common data $d_{Ac}$, so that performance of the UE a is maximized while causing weak interference to the UE b located in the neighbor cell B.

In the method exemplified in FIG. 4, the UE b transmits the preferred beamforming matrix set $S_{preferred}$ to the BS A, and the BS A performs beamforming on the private data $d_{Ap}$ and the common data $d_{Ac}$ on the basis of the preferred beamforming matrix set $S_{preferred}$. By extending this method, the UE b can transmit a preferred beamforming matrix set for the private data $d_{Ap}$ and a preferred beamforming matrix set for the common data $d_{Ac}$, which are transmitted by the BS A to the UE a. For example, the beamforming matrix set for the private data $d_{Ap}$ may be $S_{preferred}$ of Equation 4 or Equation 5 above, and the beamforming matrix set for the common data $d_{Ac}$ may be $S'_{preferred}$ of Equation 6 below.

MathFigure 6

$$S'_{preferred} = \left\{ n \left| \frac{|u_{Bc}h_{Ab}v_n|^2 \alpha p_A}{\|u_{Bc}\|^2 N_b + |u_{Bc}h_{Ab}v_A|^2(1-\alpha)p_A + |u_{Bc}h_{Bb}v_B|^2 p_B} \geq SINR_{th\_c}, n \in S_A \right. \right\} \quad \text{[Math. 6]}$$

A beamforming matrix constituting the preferred beamforming matrix set $S'_{preferred}$ for the common data $d_{Ac}$ may be a beamforming matrix in which common data has an $SINR_{th\_c}$, i.e., an SINR greater than or equal to a threshold.

When the UE b transmits the preferred beamforming matrix set $S_{preferred}$ for the private data $d_{Ap}$ and the preferred beamforming matrix set $S'_{preferred}$ for the common data $d_{Ac}$, the BS A can determine each of a Tx beamforming vector $v_A$ for the private data $d_{Ap}$ and a Tx beamforming vector $v_C$ for the common data $d_{Ac}$. The BS A may determine the Tx beamforming vector $v_A = v_i$ for the private data $d_{Ap}$ and a Tx beamforming vector $v_C = v_j$ for the common data $d_{Ac}$ by using several methods according to ranges of i and j, that is, 1) $i \in S_A$, $j \in S'_{preferred}$, 2) $i \in S_A$, $j \in S'_{preferred}{}^C$, 3) $i \in VS_{preferred}$, $j \in S'_{preferred}$, 4) $i \in S_{preferred}$, $j \in S'_{preferred}{}^C$.

Figure 5:
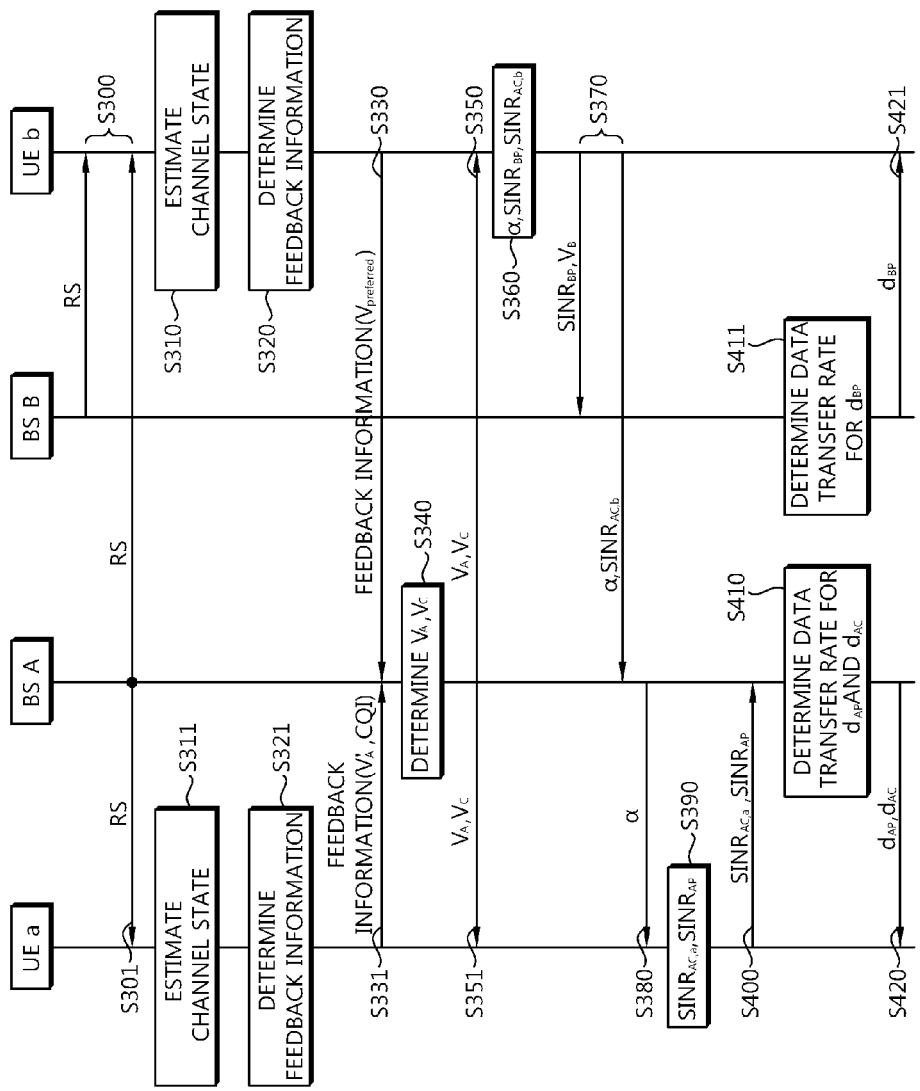
FIG. 5 is a signal flow diagram of a control signal according to an embodiment of the present invention.

FIG. 5 is a signal flow diagram of a control signal according to an embodiment of the present invention.

Referring to FIG. 5, a UE b receives a reference signal (RS) from a BS A and a BS B (step S300), and a UE a receives an RS from the BS A (step S301). For example, the RS may be a pilot signal or a sounding reference signal (SRS).

The UE b estimates a channel state by using the RS received in step S300 (step S310). The UE a estimates a channel state by using the RS received in step S301 (step S311). The channel state estimated by the UE b is a channel state between the BS A and the UE b and a channel state between the BS B and the UE b. The channel state estimated by the UE a is a channel state between the BS A and the UE a.

The UE b determines feedback information for data transmission of the BS A on the basis of the channel state estimated in step S310 (step S320). The UE a determines feedback information for data transmission of the BS A on the basis of the channel state estimated in step S311 (step S321). The feedback information may include a beamforming matrix $V_{preferred}$, a beamforming vector $v'_A$, a channel quality indicator (CQI), and so on, which are desirably used by the BS A. The feedback information may include information on a plurality of beamforming matrices or beamforming vectors.

The UE b transmits the feedback information determined in step S320 to the BS A (step S330). If the direct channel from UE b to BS A is not available, all information reported by UE b to BS A is first transmitted to BS B and then BS A receives those from BS B through the backhaul link between the two BSs. The UE a transmits the feedback information determined in step S321 to the BS A (step S331).

The BS A determines a beamforming vector $v_A$ for private data $d_{Ap}$ and a beamforming vector $v_C$ for common data $d_{Ac}$ on the basis of the feedback information received in step S330 and step S331 (step S340). When the BS A receives the information on the plurality of beamforming matrices or beamforming vectors from the UE a or the UE b, the BS A can select a beamforming vector having best performance with respect to the UE a from the plurality of beamforming vectors. In addition, the BS A may select a beamforming vector different from the beamforming matrix or beamforming vector received from the UE a or the UE b.

The BS A transmits the beamforming vectors $v_A$ and $v_C$ selected in step S340 to the UE a and the UE b (steps S350 and S351).

The UE b measures α, $SINR_{Bp}$, and $SINR_{Ac,b}$ by using the beamforming vectors $v_A$ and $v_C$ received in step 350 (step S360). Herein, α is a value in the range between 0 and 1, and denotes a ratio of Tx power allocated to common data $d_{Ac}$ among total Tx power of the BS A. $SINR_{Bp}$ denotes an Rx SINR of private data $d_{Bp}$. $SINR_{Ac,b}$ is an Rx SINR of common data $d_{Ac}$ experienced by the UE b. A method of measuring α, $SINR_{Bp}$, and $SINR_{Ac,b}$ by using $v_A$ and $v_C$ is exemplified in Equation 1 above.

The UE b transmits α and $SINR_{Ac,b}$ to the BS A, and transmits $SINR_{Bp}$ and $v_B$ to the BS B (step S370). Although it is exemplified in step S370 that the UE b transmits $v_B$ to the BS B, the UE b may determine $v_B$ in step S320 on the basis of a result obtained by performing channel estimation in step S310 and then transmit $v_B$ to the BS B before step S370.

The BS A transmits α received in step S370 to the UE a (step S380). The UE a calculates $SINR_{Ac,a}$ and $SINR_{Ap}$ by using α (step S390). Although it is exemplified herein that α is determined by the UE b, and is transmitted to the UE a via the BS A, the present invention is not limited thereto. That is, α may be a value predetermined to decrease system complexity, or may be corrected by the BS A according to a situation.

The UE a transmits $SINR_{Ac,a}$ and $SINR_{Ap}$ calculated in step S390 to the BS A (step S400).

The BS A determines a data transfer rate of private data $d_{Ap}$ and common data $d_{Ac}$ by using the $SINR_{Ac,b}$ received in step S370 and the $SINR_{Ac,a}$ and $SINR_{Ap}$ received in step S400 (step S410), and transmits the private data $d_{Ap}$ and the common data $d_{Ac}$ to the UE a (step S420). In addition, the BS B determines a data transfer rate for private data $d_{Bp}$ by using the $SINR_{Bp}$ received in step S370 (step S411), and transmits the private data $d_{Bp}$ to the UE b (step S421).

In FIG. 5, the BS A performs beamforming by using feedback information received from the UE a and the UE b. Therefore, performance of the UE a can be maximized while minimizing interference to the UE b. In particular, beamforming is performed on each of the private data $d_{Ap}$ and the common data $d_{Ac}$, and the data transfer rate of the common data $d_{Ac}$ is determined by considering both the data transfer rate for the UE a and the data transfer rate for the UE b. Accordingly, if the UE a and the UE b can decode the common data $d_{Ac}$, interference caused by the common data $d_{Ac}$ to the UE b can be cancelled.

Figure 6:
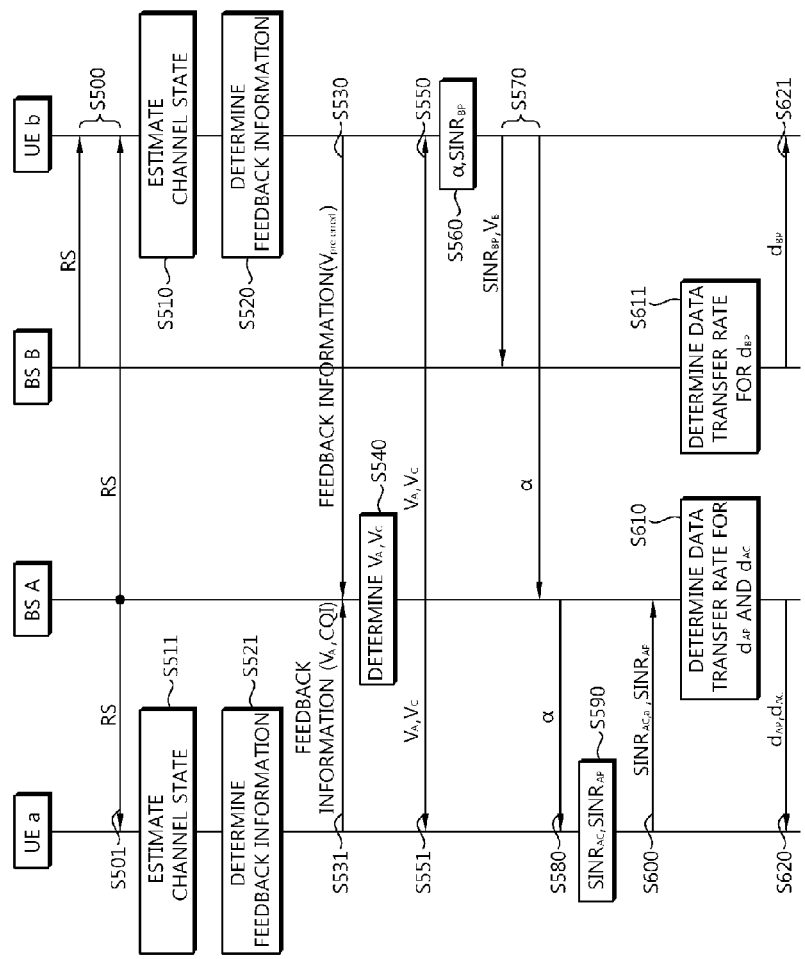
FIG. 6 is a signal flow diagram of a control signal according to another embodiment of the present invention.

FIG. 6 is a signal flow diagram of a control signal according to another embodiment of the present invention when a UE b does not decode common data.

Referring to FIG. 6, the UE b receives a reference signal (RS) from a BS A and a BS B (step S500), and a UE a receives an RS from the BS A (step S501). For example, the RS may be a pilot signal or a sounding reference signal (SRS).

The UE b estimates a channel state by using the RS received in step S500 (step S510). The UE a estimates a channel state by using the RS received in step S501 (step S511). The channel state estimated by the UE b is a channel state between the BS A and the UE b and a channel state between the BS B and the UE b. The channel state estimated by the UE a is a channel state between the BS A and the UE a.

The UE b determines feedback information for data transmission of the BS A on the basis of the channel state estimated in step S510 (step S520). The UE a determines feedback information for data transmission of the BS A on the basis of the channel state estimated in step S511 (step S521). The feedback information may include a beamforming matrix $V_{preferred}$, a beamforming vector $V_A$, a channel quality indicator (CQI), or the like, which are desirably used by the BS A. The feedback information may include information on a plurality of beamforming matrices or beamforming vectors.

The UE b transmits the feedback information determined in step S520 to the BS A (step S530). The UE a transmits the feedback information determined in step S521 to the BS A (step S531).

The BS A determines a beamforming vector $v_A$ for private data $d_{Ap}$ and a beamforming vector $v_c$ for common data $d_{Ac}$ on the basis of the feedback information received in step S530 and step S531 (step S540). When the BS A receives the information on the plurality of beamforming matrices or beamforming vectors from the UE a or the UE b, the BS A can select a beamforming vector having best performance with respect to the UE a from the plurality of beamforming vectors. In addition, the BS A may select a beamforming vector different from the beamforming matrix or beamforming vector received from the UE a or the UE b.

The BS A transmits the beamforming vectors $v_A$ and $v_C$ selected in step S540 to the UE a and the UE b (steps S550 and S551).

The UE b measures $\alpha$, $SINR_{Bp}$, and $SINR_{Ac,b}$ by using the beamforming vectors $v_A$ and $v_C$ received in step 550 (step S560). Herein, $\alpha$ is a value in the range between 0 and 1, and denotes a ratio of Tx power allocated to common data $d_{Ac}$ among total Tx power of the BS A. $SINR_{Bp}$ denotes an Rx SINR of private data $d_{Bp}$.

The UE b transmits $\alpha$ to the BS A, and transmits $SINR_{Bp}$ and $v_B$ to the BS B (step S570). Although it is exemplified in step S570 that the UE b transmits $v_B$ to the BS B, the UE b may determine $v_B$ in step S520 on the basis of a result obtained by performing channel estimation in step S510 and then transmit $v_B$ to the BS B before step S570.

The BS A transmits $\alpha$ received in step S570 to the UE a (step S580). The UE a calculates $SINR_{Ac,a}$ and $SINR_{Ap}$ by using a (step S590). Although it is exemplified herein that $\alpha$ is determined by the UE b, and is transmitted to the UE a via the BS A, the present invention is not limited thereto. That is, $\alpha$ may be a value predetermined to decrease system complexity, or may be corrected by the BS A according to a situation.

The UE a transmits $SINR_{Ac,a}$ and $SINR_{Ap}$ calculated in step S590 to the BS A (step S600).

The BS A determines a data transfer rate of private data $d_{Ap}$ and common data $d_{Ac}$ by using the $SINR_{Ac}$ and $SINR_{Ap}$ received in step S600 (step S610), and transmits the private data $d_{Ap}$ and the common data $d_{Ac}$ to the UE a (step S620). In addition, the BS B determines a data transfer rate for private data $d_{Bp}$ by using the $SINR_{Bp}$ received in step S571 (step S611), and transmits the private data $d_{Bp}$ to the UE b (step S621).

In FIG. 6, the BS A performs beamforming by using feedback information received from the UE a and the UE b. Therefore, performance of the UE a can be maximized while minimizing interference to the UE b. In particular, the BS A performs beamforming by using the beamforming matrix that causes weak interference to UE b. Accordingly, even if the UE b cannot decode the common data $d_{Ac}$ and thus cannot cancel interference caused by the common data $d_{Ac}$, interference caused by the BS A to the UE b can be avoided in advance.

Hereinafter, a method of performing beamforming by a BS will be described in greater detail when the BS transmits data by using multiple streams. A multiple input multiple output (MIMO) system can obtain a spatial multiplexing gain by transmitting multiple streams through a plurality of Tx antennas. The method of performing beamforming by using the multiple streams can be easily understood by those ordinary skilled in the art by reference to the content disclosed in the present invention. In the following description, a case where multiple streams are transmitted using a unitary beamforming matrix will be explained in detail.

A unitary matrix U is an n×n matrix satisfying Equation 7 below.

MathFigure 7

$$UU^* = U^*U = I \qquad \text{[Math. 7]}$$

Herein, U* denotes a conjugate transpose matrix of U, and I denotes an identity matrix.

Figure 7:
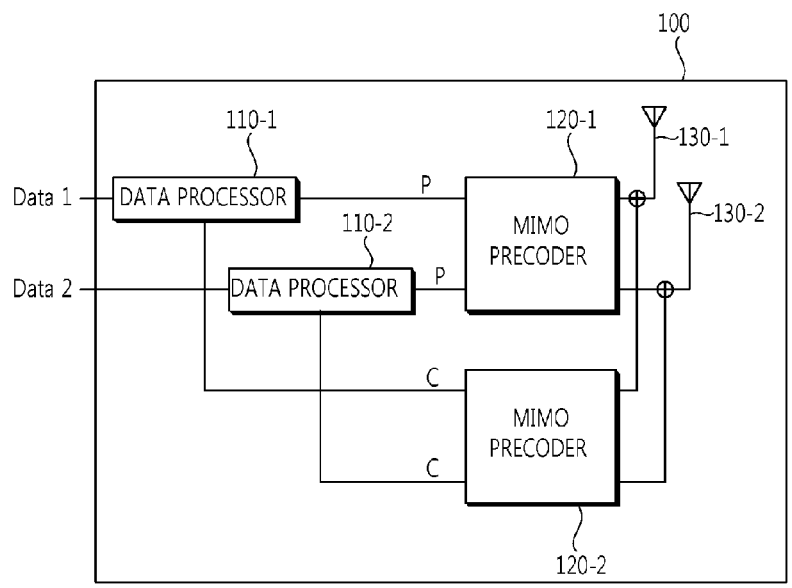
FIG. 7 is a block diagram showing a structure of a transmitter for transmitting data by using a unitary beamforming matrix according to an embodiment of the present invention.

FIG. 7 is a block diagram showing a structure of a transmitter for transmitting data by using a unitary beamforming matrix according to an embodiment of the present invention.

Referring to FIG. 7, a transmitter 100 includes data processors 110-1 and 110-2, MIMO precoders 120-1 and 120-2, and Tx antennas 130-1 and 130-2. The transmitter 100 may be a part of a BS in downlink transmission.

The data processor 110-1 splits data 1 to be transmitted into private data $d_{1p}$ and common data $d_{1c}$, and performs power control. The data processor 110-2 splits data 2 to be transmitted into private data $d_{2p}$ and common data $d_{1c}$, and performs power control.

The MIMO precoder 120-1 processes the private data $d_{1p}$ and $d_{2p}$ by using a first unitary beamforming matrix. The MIMO precoder 120-2 processes the common data $d_{1c}$ and $d_{2c}$ by using a second unitary beamforming matrix. Equation 8 describes this process.

MathFigure 8

$$s = U_1 \begin{bmatrix} d_{1p} \\ d_{2p} \end{bmatrix} + U_2 \begin{bmatrix} d_{1c} \\ d_{2c} \end{bmatrix} \qquad \text{[Math. 8]}$$

where $U_1$ and $U_2$ are the first and second unitary beamforming matrix, respectively, and s denotes transmit signal where the first and second element of s are transmitted by Tx antenna 130-1 and 130-2, respectively. As described above, $U_1$ and $U_2$ is selected among $\{U_n | n \in S_A\}$, $\{U_n | n \in S_{preferred}\}$, $\{U_n | n \in S'_{preferred}\}$, $\{U_n | n \in S_{preferred}^C\}$ or $\{U_n | n \in S'^{C}_{preferred}\}$.

In FIG. 7, two streams are used for each of common data and private data for example. However, the present invention is not limited thereto, and thus the number of streams of common data and the number of streams of private data each may be 2 or higher, and the number of streams of common data may differ from the number of streams of private data. If the number of streams of common data differs from the number of streams of private data, the number of vectors of the first unitary beamforming matrix may differ from that of the second unitary beamforming matrix. The use of the unitary beamforming matrix simplifies calculation, thereby decreasing system complexity.

Figure 8:
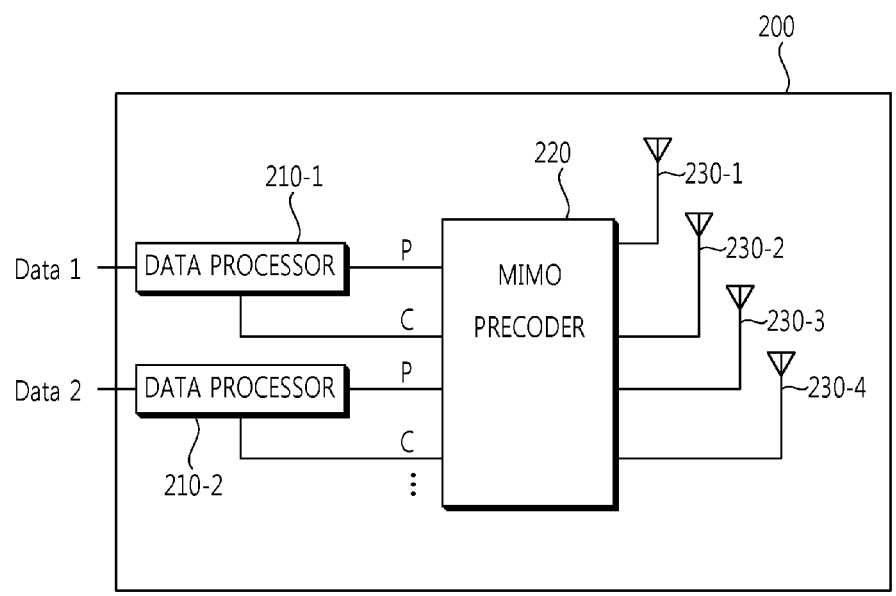
FIG. 8 is a block diagram showing a structure of a transmitter for transmitting data by using a unitary beamforming matrix according to another embodiment of the present invention.

FIG. 8 is a block diagram showing a structure of a transmitter for transmitting data by using a unitary beamforming matrix according to another embodiment of the present invention.

Referring to FIG. 8, a transmitter 200 includes data processors 210-1 and 210-2, a MIMO precoder 220, and Tx antennas 230-1, 230-2, 230-3, and 230-4. The transmitter 200 may be a part of a BS in downlink transmission.

The data processor 210-1 splits data 1 to be transmitted into private data $d_{1p}$ and common data $d_{1c}$, and performs power control. The data processor 210-2 splits data 2 to be transmitted into private data $d_{2p}$ and common data $d_{1c}$, and performs power control.

The MIMO precoder 220 processes the private data $d_{1p}$ and $d_{2p}$ by using a unitary beamforming matrix. The unitary beamforming matrix consists of a specific number of beamforming vectors, wherein the specific number is equal to a total number of pieces of private data and common data. Equation 9 describes this process.

MathFigure 9

$$s = U \begin{bmatrix} d_{1p} \\ d_{2p} \\ d_{1c} \\ d_{2c} \end{bmatrix}$$ [Math. 9]

where U is unitary beamforming matrix and s denotes transmit signal where the $i^{th}$ element of s are transmitted by Tx antenna 230-$i$.

The use of the unitary beamforming matrix simplifies calculation, thereby decreasing system complexity.

Unlike in the transmitter of FIG. 7, the transmitter of FIG. 8 uses one unitary beamforming matrix consisting of a specific number of orthogonal beamforming vectors, wherein the specific number is equal to a total number of pieces of private data and common data. Herein, a method of determining a unitary beamforming matrix can be divided according to whether a BS A receives a preferred beamforming matrix set from a UE b.

First, if the UE b transmits the preferred beamforming matrix set to the BS A, a preference order of a plurality of beamforming vectors constituting the preferred beamforming matrix may be included. That is, for each of the plurality of beamforming vectors, the BS A may announce an order of strengths of interferences caused by the BS A to the UE b. Alternatively, the BS A may announce a beamforming vector having strongest interference caused by the BS A to the UE b among the plurality of beamforming vectors. In this case, the BS A may first allocate a beamforming vector to private data according to an order of causing weak interferences to the UE b, and then allocate the remaining beamforming vectors to common data. Alternatively, the BS A may first allocate a beamforming vector to common data according to the order of causing weak interferences to the UE b, and then allocate the remaining beamforming vectors to private data.

Next, if the UE b does not transmit the preferred beamforming matrix set to the BS A, the BS A needs to know a preference order of beamforming vectors constituting each beamforming matrix with respect to all beamforming matrices that can be selected by the BS A. For example, there is a need to know an order of strengths of interferences caused by the beamforming vectors constituting each beamforming matrix to the UE b. In this case, the BS A may first allocate a beamforming vector to private data in the order of causing weak interferences to the UE b, and then allocate the remaining beamforming vectors to common data. In addition, the BS A may first allocate a beamforming vector to common data in the order of causing weak interferences to the UE b, and then allocate the remaining beamforming vectors to private data. Information on the preference order may be fed back by the UE b to the BS A, or may be calculated by the BS A when the UE b transmits it to the BS B by quantizing a channel between the UE b and the BS A.

However, if the BS A cannot know the preference order of the UE b with respect to a plurality of beamforming vectors constituting one beamforming matrix, each beamforming vector can be mapped in an arbitrary order.

The invention claimed is:

1. A method of transmitting data in a multi-cell cooperative wireless communication system, the method comprising:
splitting the data to be transmitted into first data and second data, wherein the data is transmitted to a serving terminal located within a cell of a base station;
obtaining feedback information from a neighbor terminal located within a neighbor cell, wherein the feedback information includes at least one preferred beamforming vector determined by the neighbor terminal;
determining a first beamforming vector for the first data and a second beamforming vector for the second data, wherein the first beamforming vector and the second beamforming vector are determined based on the at least one preferred beamforming vector; and
transmitting, to the serving terminal and the neighbor terminal, the first data by using the first beamforming vector and the second data by using the second beamforming vector;
obtaining Signal to Interference plus Noise Ratio (SINR) information from the serving terminal;
obtaining SINR information from the neighbor terminal;
determining a first data transmission rate for the first data and a second data transmission rate for the second data according to the SINR information of the serving terminal and the SINR information of the neighbor terminal; and
transmitting the first data according to the first beamforming vector and the first data transmission rate and transmitting the second data according to the second beamforming vector and the second data transmission rate.

2. The method of claim 1, wherein the feedback information comprises at least one beamforming matrix causing interference to the neighbor cell, and the interference is higher or lower than a specific level.

3. The method of claim 1, wherein the first beamforming vector is determined without consideration of interference to the neighbor cell, and the second beamforming vector is determined by considering interference to the neighbor cell.

4. The method of claim 3, wherein the second beamforming vector is determined such that the second data causes interference to the neighbor cell, and the interference is higher than a specific level.

5. The method of claim 3, wherein the second beamforming vector is determined such that the second data causes interference to the neighbor cell, and the interference is lower than a specific level.

6. The method of claim 1, wherein the first beamforming vector and the second beamforming vector are further determined by considering interference to the neighbor cell.

7. The method of claim 6, wherein the first beamforming vector is determined such that the first data causes first interference to the neighbor cell, and the second beamforming vector is determined such that the second data causes second interference to the neighbor cell, and the first interference is lower than a specific level, and the second interference is higher than the specific level.

8. The method of claim 6, wherein the first beamforming vector and the second beamforming vector are determined such that each of the first data and the second data causes interference to the neighbor cell, and the interference is lower than a specific level.

9. The method of claim 1, wherein the first data and the second data are transmitted by being processed with one unitary beamforming matrix.

10. The method of claim 9, wherein the unitary beamforming matrix allows the first data and the second data to cause interference to the neighbor cell, and the interference is lower than a specific level.

11. The method of claim 9, wherein the unitary beamforming matrix consists of a plurality of beamforming vectors, and wherein a beamforming vector having relatively weak interference to the neighbor cell among the plurality of beamforming vectors is allocated to the first data, and the remaining vectors are allocated to the second data.

12. The method of claim 9, wherein the unitary beamforming matrix consists of a plurality of beamforming vectors, and wherein a beamforming vector having relatively weak interference to the neighbor cell among the plurality of beamforming vectors is allocated to the second data, and the remaining vectors are allocated to the first data.

13. The method of claim 1, wherein the first beamforming matrix is a first unitary beamforming matrix, and the second beamforming matrix is a second unitary beamforming matrix.

14. The method of claim 1, wherein the first beamforming matrix is a first unitary beamforming matrix, or the second beamforming matrix is a second unitary beamforming matrix.

15. The method of claim 13 wherein the first data and the second data are transmitted in a superposition manner.

* * * * *